US008387929B2

(12) United States Patent
Lin et al.

(10) Patent No.: US 8,387,929 B2
(45) Date of Patent: Mar. 5, 2013

(54) ADJUSTABLE STAND HAVING ROTATABLE STRUCTURE

(75) Inventors: Ze-Bo Lin, Shenzhen (CN); Jian-Hui Dai, Shenzhen (CN); Shou-Ji Liu, Shenzhen (CN); Te-Sheng Jan, Taipei Hsien (TW); Yu-Tao Chen, Taipei Hsien (TW); Chun-Che Yen, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 108 days.

(21) Appl. No.: 12/901,665

(22) Filed: Oct. 11, 2010

(65) Prior Publication Data

US 2011/0226924 A1    Sep. 22, 2011

(30) Foreign Application Priority Data

Mar. 16, 2010   (CN) .......................... 2010 1 0125779

(51) Int. Cl.
*A47F 5/12* (2006.01)

(52) U.S. Cl. ......... 248/139; 248/130; 248/131; 248/477

(58) Field of Classification Search .................. 248/130, 248/131, 139, 477, 488, 473, 475.1, 476, 248/485, 469, 471, 474, 479

See application file for complete search history.

(56) References Cited

U.S. PATENT DOCUMENTS

| | | | | |
|---|---|---|---|---|
| 852,864 | A * | 5/1907 | Wright et al. | 248/471 |
| 2,144,876 | A * | 1/1939 | Garnett | 248/205.5 |
| 4,697,780 | A * | 10/1987 | Wenkman et al. | 248/558 |
| 5,833,189 | A * | 11/1998 | Rossman et al. | 248/231.61 |
| 6,488,321 | B1 * | 12/2002 | Huang | 294/187 |
| 6,520,467 | B2 * | 2/2003 | Thomas et al. | 248/309.3 |
| 6,942,188 | B2 * | 9/2005 | Tsay et al. | 248/205.8 |
| 6,979,092 | B2 * | 12/2005 | Liang | 359/876 |
| 7,303,171 | B1 | 12/2007 | Chen | |
| 7,357,361 | B2 * | 4/2008 | Yen | 248/205.8 |
| 7,387,284 | B2 * | 6/2008 | Chang | 248/206.5 |
| 7,648,116 | B2 * | 1/2010 | Kang | 248/475.1 |
| 7,661,648 | B2 * | 2/2010 | Lin | 248/683 |
| 7,748,583 | B1 * | 7/2010 | Woltman | 224/251 |
| 7,760,410 | B2 * | 7/2010 | Kim | 359/221.2 |
| 2001/0020668 | A1 * | 9/2001 | Thomas et al. | 248/309.3 |
| 2004/0232298 | A1 * | 11/2004 | Bremmon et al. | 248/281.11 |
| 2005/0205744 | A1 * | 9/2005 | Singh | 248/351 |
| 2010/0044535 | A1 * | 2/2010 | Cheng et al. | 248/188.9 |
| 2011/0226923 | A1 * | 9/2011 | Lin et al. | 248/363 |

* cited by examiner

*Primary Examiner* — Nkeisha Smith
(74) *Attorney, Agent, or Firm* — Altis Law Group, Inc.

(57) ABSTRACT

An adjustable stand, for supporting a device having a lateral surface defining a number of recessed portions, includes a base, a rotating frame, and two connecting axles. The rotating frame includes a chassis and two opposing arms extending arcuately and upward from the chassis, wherein the chassis is rotatably connected to the base. The two connecting axles are rotatably connected to the two opposing arms, respectively. Each of the two connecting axles includes at least one elastic protrusion fitting into one of the plurality of recessed portions, and connecting the device to the two connecting axles, wherein the at least one elastic protrusion is able to deform to allow the device to rotatably connect with the two connecting axles.

10 Claims, 5 Drawing Sheets

ADJUSTABLE STAND HAVING ROTATABLE STRUCTURE

BACKGROUND

1. Technical Field

The present disclosure relates to an adjustable stand.

2. Description of Related Art

A motor vehicle may include a stand for supporting a device, such as a mini computer, a mobile navigation apparatus, or a mobile phone. The stand usually includes a base for adhering the stand to a surface of the motor vehicle, and a rotating frame mounted on the base for supporting the device. The rotating frame is usually rotatable about a shaft of the base. However, the rotating frame can usually only rotate about one axis of rotation, which is too limiting in certain conditions.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
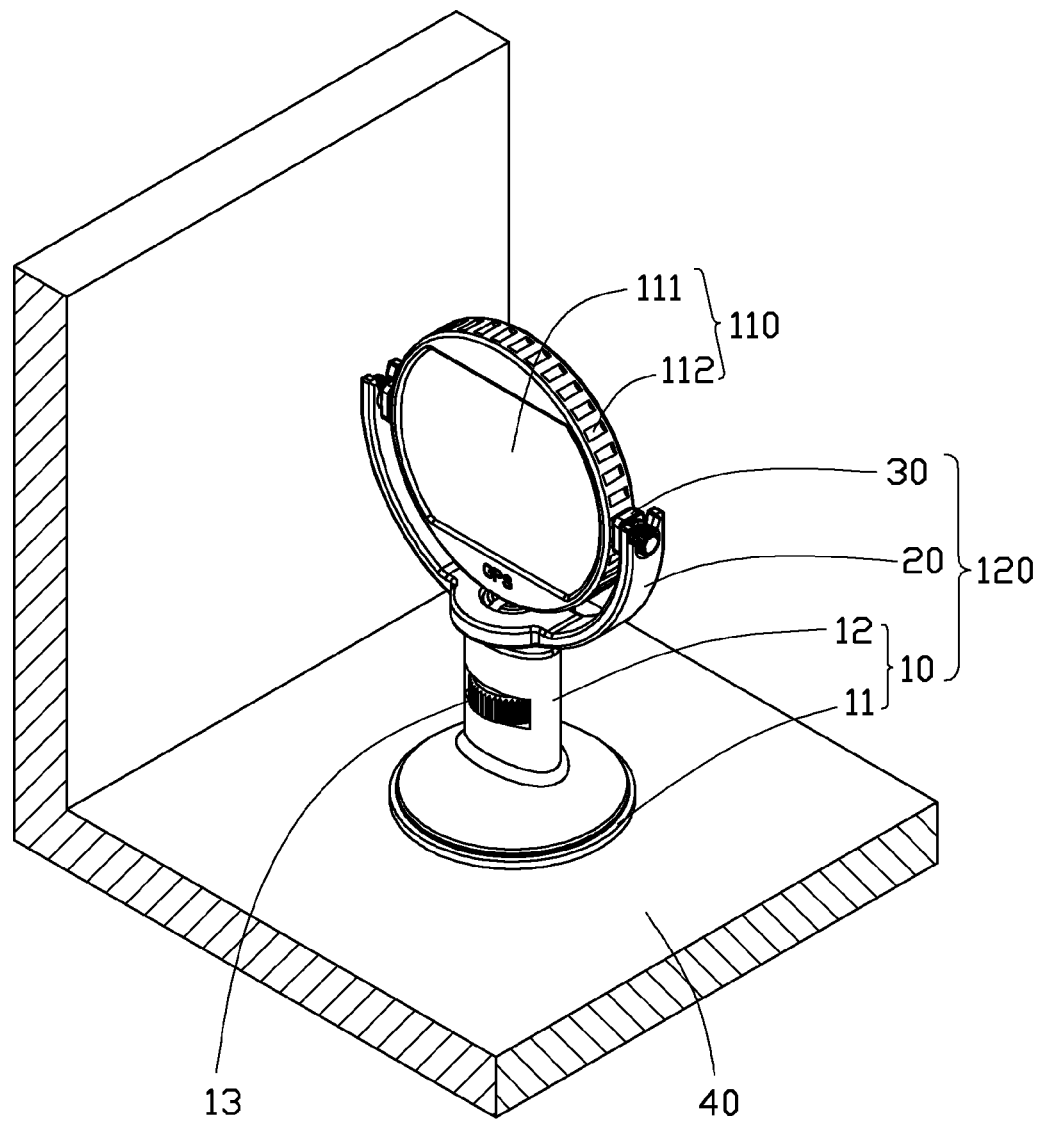
FIG. 1 is a schematic, isometric view of an adjustable stand for supporting a device according to an exemplary embodiment.

Referring to FIG. 1, an embodiment showing a device 110 supported by a stand 120 is illustrated. The device 110 includes a display 111. In the embodiment, the device 110 is round, and defines a number of recessed portions 112 around its lateral surface. The recessed portions 112 are evenly spaced from each other and extend along a direction perpendicular to the display 111. The stand 120 includes a base 10 and a rotating frame 20 mounted on the base 10.

Figure 2:
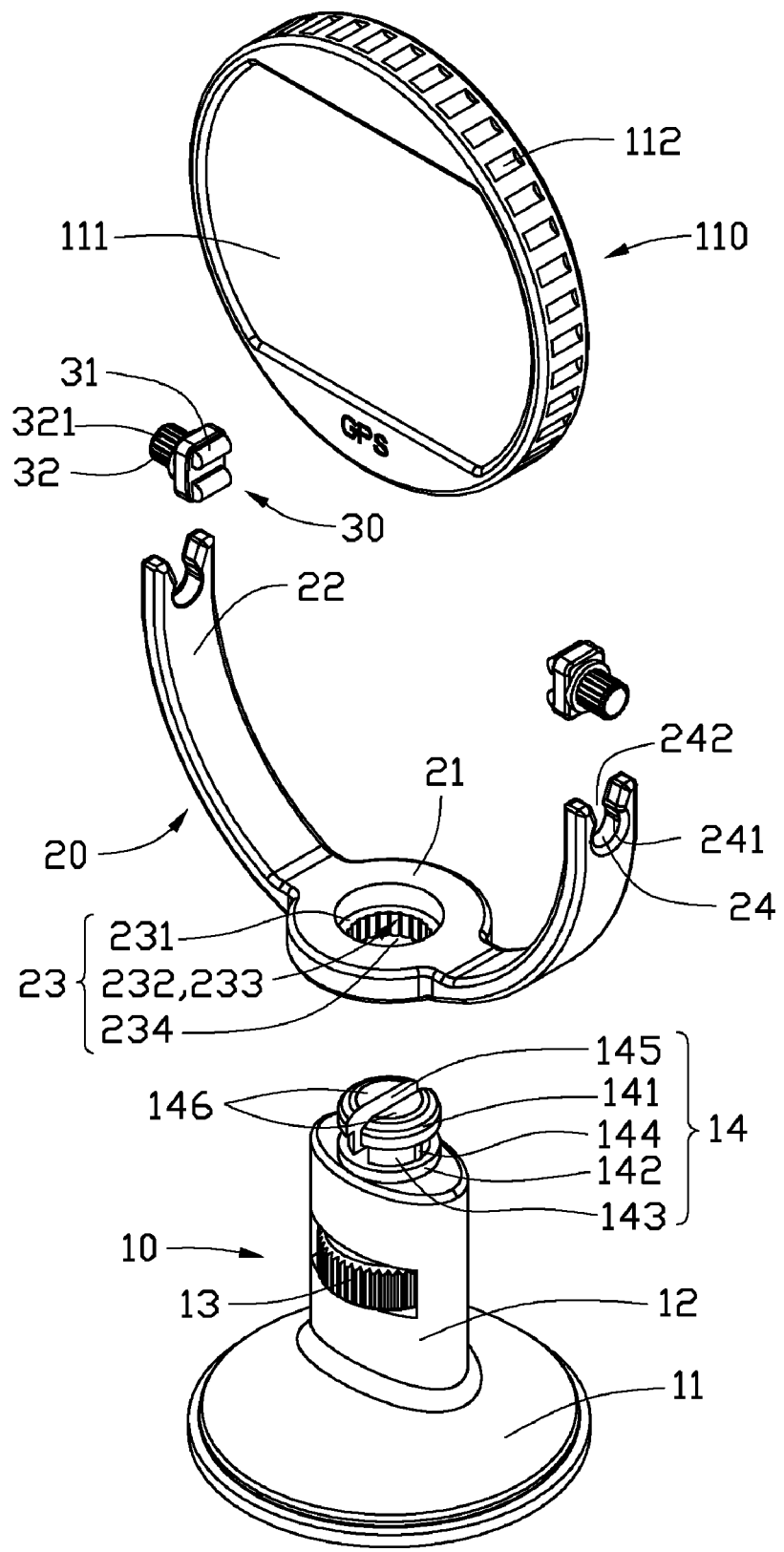
FIG. 2 is an exploded view of the stand of FIG. 1.

Referring also to FIG. 2, the base 10 includes a seat 11, a support 12 protruding from the seat 11, an adjusting wheel 13, and a connecting member 14. The seat 11 is substantially round and can be a suction cup that can be attached to a support surface 40. In an alternative embodiment, the seat 11 may be attached to the support surface 40 by any suitable connection techniques, such as gluing. The adjusting wheel 13 is used to adjust the suction force of the seat 11 to firmly attach the seat 11 to the support surface 40 or to easily detach the seat 11 from the support surface 40.

The connecting member 14 is made of elastic material and protrudes from the top of the support 12. In the embodiment, the connecting member 14 includes a top 141, a bottom 142, and a reduced middle portion 143 between the top 141 and the bottom 142. A lateral surface of the middle portion 143 defines at least one protrusion 144 extending along an axial direction of the connecting member 14. The connecting member 14 further defines a slot 145 that extends downwardly from the top 141, forming two spring members 146 spaced from each other.

The rotating frame 20 includes a circular chassis 21 and two opposing arms 22 extending arcuately and upward from the edge of the chassis 21. In the embodiment, the rotating frame 20 is arc-shaped with a diameter slightly larger than a diameter of the device 110. The chassis 21 is rotatably connected to the base 10. In the embodiment, the center of the chassis 21 defines a stepped hole 23 sized to fittingly receive the connecting member 14. The stepped hole 23 includes a larger hole portion 232 and a smaller hole portion 233 joined by an annular shoulder 231 for rotatably connecting with the connecting member 14. In the embodiment, the top 141 is larger than the smaller hole portion 233, but can be deformed to allow the top 141 to pass through the smaller hole portion 233 when the two spring members 146 are caused to deflect toward each other. A lateral surface of the smaller hole portion 233 defines a number of internal grooves 234 sized to retain the protrusion 144. The grooves 234 are evenly spaced from each other and extend along an axial direction of the stepped hole 23.

When being assembled, the rotating frame 20 is first orientated to cause the stepped hole 23 to be aligned with the connecting member 14. The rotating frame 20 is then pressed downwardly, causing the ends of the spring members 146 of the connecting member 14 to move toward each other, to allow the spring member 146 to pass through the stepped hole 23. At this point, the top 141 of the connecting member 14 is received in the larger hole portion 232 and rests on the annular shoulder 231, and the bottom of the chassis 21 rests on the bottom 142 of the connecting member 14. The rotating frame 20 is thus connected to the connecting member 14. The rotating frame 20 can rotate with respect to the connecting member 14 and can be retained in a first desired position by the engagement of the protrusion 144 of the connecting member 14 with the groove 234 corresponding to the first desired position.

A notch 24 is defined in a distal end of each arm 22. In the embodiment, the notch 24 is substantially circular and includes a reduced opening 242. The notch 24 also defines at least one protrusion 241 in its lateral surface.

The stand 120 further includes two connecting axles 30 rotatably connected to the two opposing arms 22, respectively. Each of the two connecting axles 30 includes a shaft 32 and at least one elastic protrusion 31 protruding from one end surface of the shaft 32. The shaft 32 is sized to fit into the notch 24, but cannot pass through the reduced opening 242. A lateral surface of the shaft 32 defines a number of grooves 321 sized to retain the protrusion 241. The grooves 321 are evenly spaced from each other and extend along an axial direction of the shaft 32. The shaft 32 can rotate with respect to the notch 24 and can be retained in a second desired position by the engagement of the protrusion 241 of the notch 24 with the groove 321 corresponding to the second desired position. The protrusion 31 is sized to fit into one of the number of recessed portions 112, and connects the device 110 to the two connecting axles 30. The at least one elastic protrusion 31 is able to deform to allow the device 110 to rotatably connect with the two connecting axles 30.

Figure 3:
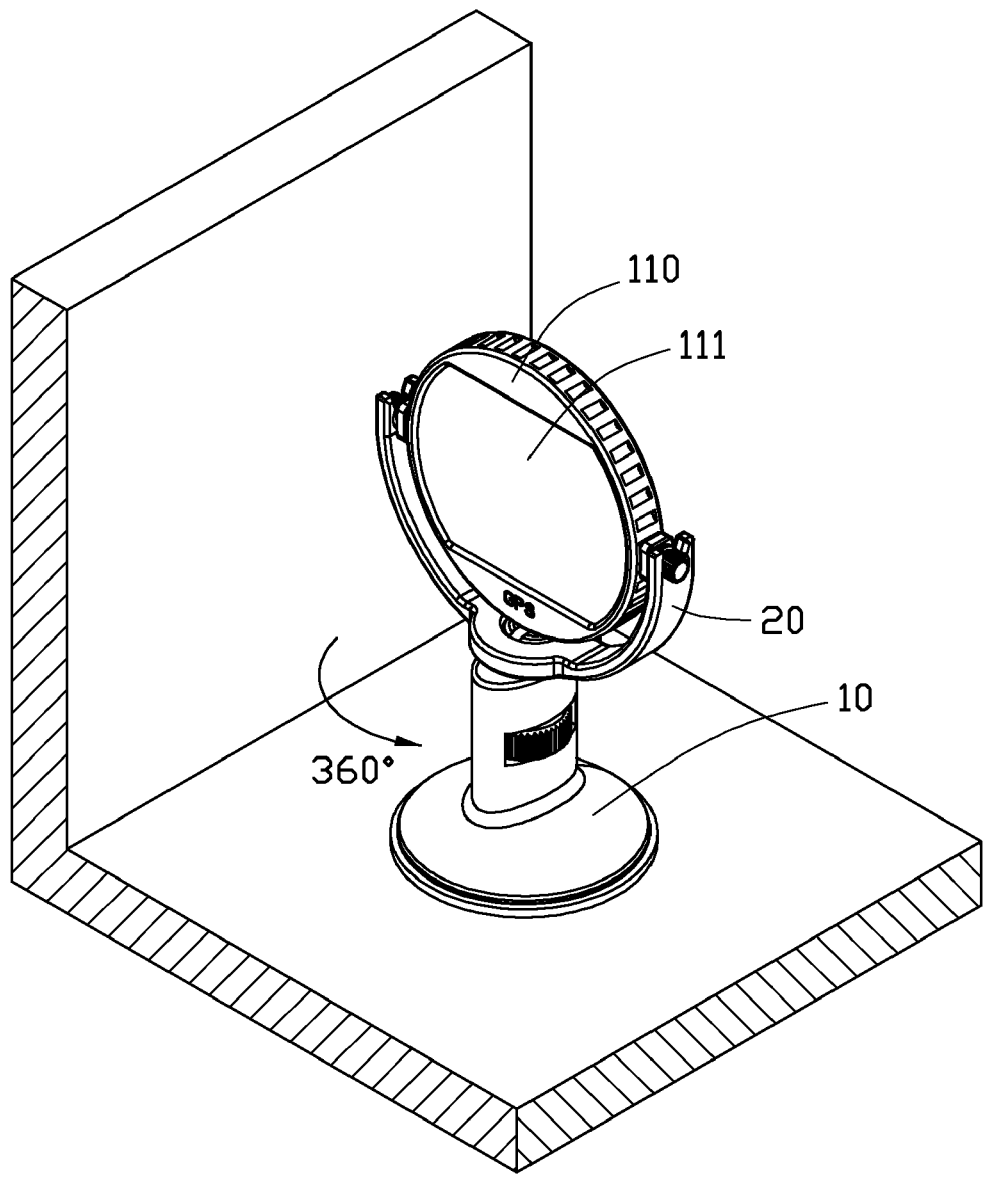
FIG. 3 is a schematic, isometric view showing the stand in a first state.
Figure 4:
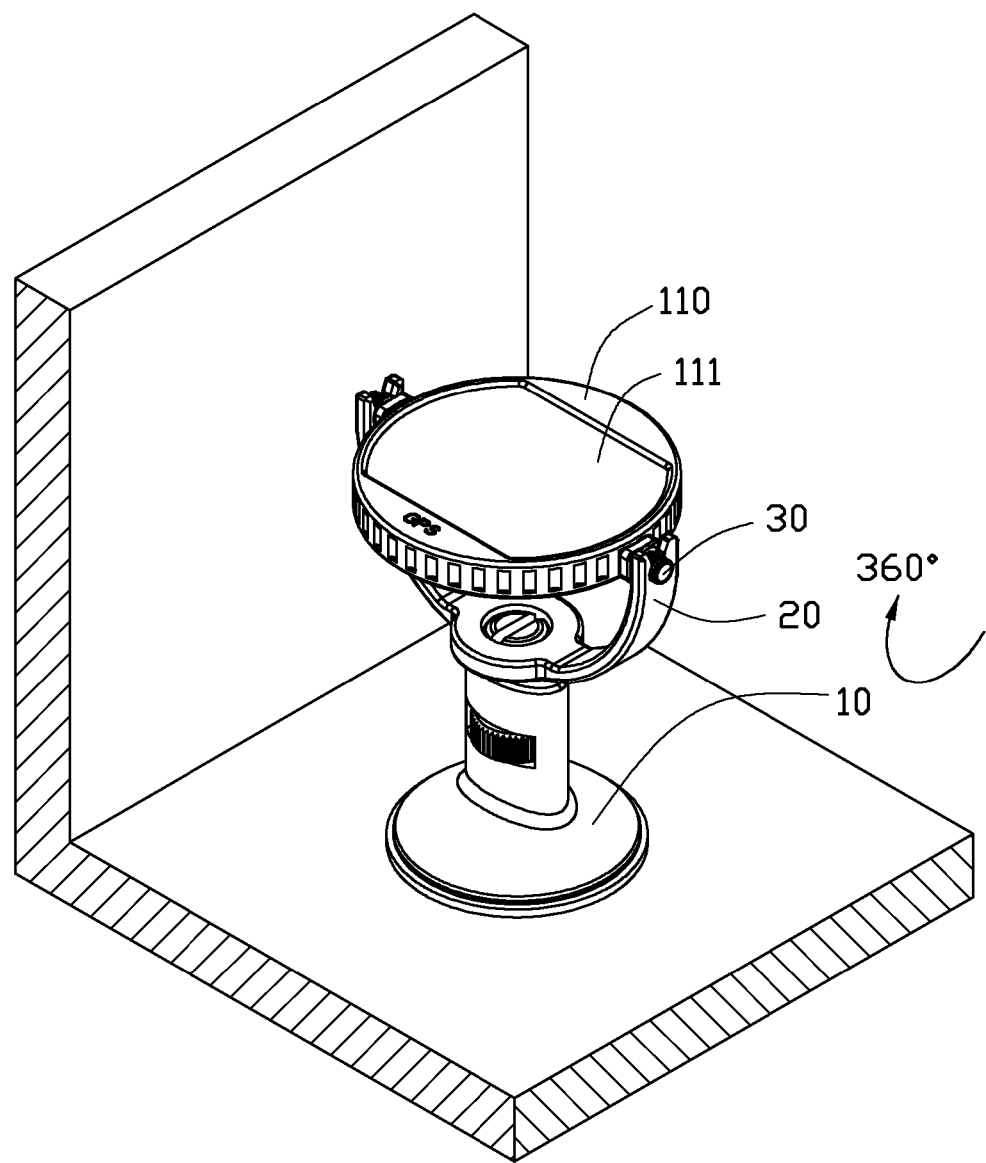
FIG. 4 is a schematic, isometric view showing the stand in a second state.

Referring to FIG. 3, when the base 10 is attached to a substantially horizontal surface, the device 110 can stay upright and rotate about 360 degrees depending on the rotation of the rotating frame 20 about the middle portion 143 of the connecting member 14. Referring to FIG. 4, when needed, the device 110 can rotate about the axles 30 from the upright orientation to a desired orientation, such as a horizontal orientation.

Figure 5:
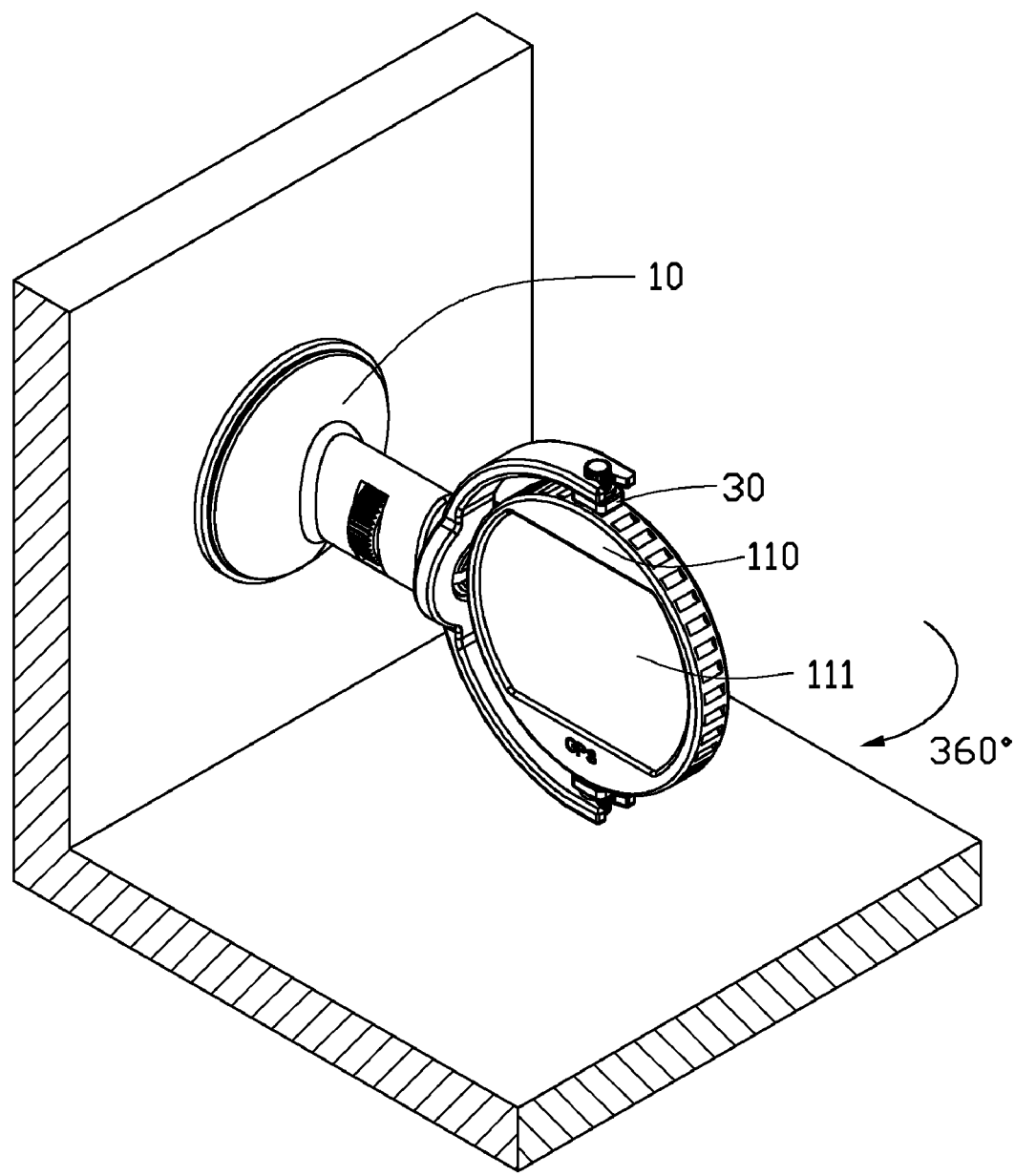
FIG. 5 is a schematic, isometric view showing the stand in a third state.

Referring to FIG. 5, when the base 10 is attached to a non-horizontal surface, the device 110 can be turned about its own axis of rotation to maintain an upright orientation for keeping the display content of the display 111 upright.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An adjustable stand for supporting a device having a lateral surface defining a plurality of recessed portions, the stand comprising:
    a base comprising a support and a connecting member protruding from a top portion of the support;
    a rotating frame mounted on the base, the rotating frame comprising:
    a chassis defining a hole in a center thereof, wherein the hole is sized to fittingly receive the connecting member, to enable the chassis to be rotatably connected to the base; and
    two opposing arms extending arcuately and upward from the chassis, wherein a substantially circular notch is defined in a distal end of each arm; and
    two connecting axles rotatably connected to the two opposing arms, respectively, each of the two connecting axles comprising a shaft and at least one elastic first protrusion protruding from one end surface of the shaft, wherein each of the shafts is sized to fit into one of the notches, and each of the at least one elastic first protrusion is configured for fitting into one of the plurality of recessed portions, and connecting the device to the two connecting axles, wherein the at least one elastic first protrusion is able to deform for allowing the device to be rotatably held between the two connecting axles.

2. The adjustable stand of claim 1, wherein the base further comprises a seat where the support protruding from, wherein the seat is a suction cup and configured for being attached to a support surface.

3. The adjustable stand of claim 2, wherein the base further comprises an adjusting wheel configured for adjusting suction force of the seat.

4. The adjustable stand of claim 1, wherein the hole is a stepped hole, and comprises a larger hole portion and a smaller hole portion joined by an annular shoulder for rotatably connecting with the connecting member.

5. The adjustable stand of claim 4, wherein the connecting member is made of elastic material, the connecting member comprises a top and a bottom, and defines a slot that extends downwardly from the top, forming two spring members spaced from each other, the top is larger than the smaller hole portion, but can be deformed to allow the top to pass through the smaller hole portion when the two spring members are caused to deflect toward each other.

6. The adjustable stand of claim 5, wherein the connecting member defines a reduced middle portion between the top and the bottom, a lateral surface of the middle portion defines at least one second protrusion extending along an axial direction of the connecting member; a lateral surface of the smaller hole portion defines a number of first internal grooves sized to retain the at least one second protrusion; an engagement of the at least one second protrusion with at least one of the first internal grooves corresponding to a first desired position enables the rotating frame to rotate with respect to the connecting member and be retained in the first desired position.

7. The adjustable stand of claim 6, wherein the first internal grooves are evenly spaced from each other and extend along an axial direction of the smaller hole portion.

8. The adjustable stand of claim 1, wherein each of the notches comprises a reduced opening through which the shaft cannot pass.

9. The adjustable stand of claim 1, wherein each of the notches defines at least one lateral protrusion in its lateral surface; a lateral surface of the shaft defines a number of second grooves sized to retain the at least one lateral protrusion; the engagement of the at least one lateral protrusion with at least one of the second grooves corresponding to a second desired position enables the shaft to rotate with respect to the notch and be retained in the second desired position.

10. The adjustable stand of claim 9, wherein the second grooves are evenly spaced from each other and extend along an axial direction of the shaft.

* * * * *